United States Patent [19]

Nahmias et al.

[11] Patent Number: 4,604,324

[45] Date of Patent: Aug. 5, 1986

[54] MULTI-LAYER POLYPROPYLENE FILM STRUCTURE AND METHOD OF FORMING THE SAME

[75] Inventors: A. Michael Nahmias, Victor; Hee C. Park, Fairport, both of N.Y.

[73] Assignee: Mobil Oil Corporation, New York, N.Y.

[21] Appl. No.: 655,614

[22] Filed: Sep. 28, 1984

[51] Int. Cl.$^4$ .............................................. B32B 27/08
[52] U.S. Cl. .................................... 428/349; 428/516; 428/910; 525/240; 156/244.11; 156/244.24
[58] Field of Search ............... 428/516, 349, 910, 347; 525/240; 156/244.11, 244.24

[56] References Cited

U.S. PATENT DOCUMENTS

| | | | |
|---|---|---|---|
| 3,399,156 | 8/1968 | Bell | 524/583 |
| 3,783,088 | 5/1971 | Yoshiyasu et al. | |
| 3,841,943 | 11/1971 | Takashi et al. | |
| 4,118,438 | 10/1978 | Matsui et al. | |
| 4,348,457 | 9/1982 | Rosenthal et al. | 428/349 |
| 4,377,616 | 3/1983 | Ashcraft et al. | |
| 4,419,410 | 12/1983 | Weiner | 428/349 |
| 4,419,411 | 12/1983 | Park | 428/516 |

Primary Examiner—Edith Buffalow
Attorney, Agent, or Firm—A. J. McKillop; M. G. Gilman; J. P. O'Sullivan, Sr.

[57] ABSTRACT

A multi-layer polypropylene structure of low COF also having antistick characteristics over a wide temperature range and a method of forming the same.

15 Claims, No Drawings

MULTI-LAYER POLYPROPYLENE FILM STRUCTURE AND METHOD OF FORMING THE SAME

BACKGROUND OF THE INVENTION

The invention relates to a mult-layer polypropylene structure which has exceptionally low film to film coefficient of friction over a wide temperature range and which, when used to wrap packages secured by a heat seal layer or layers, avoids package to package sticking in any heat seal region Highly crystalline polypropylene film is an excellent packaging material, but it has a high film to film coefficient of friction which makes it difficult to utilize in automatic packaging equipment. This material in film form has a tendency to stick at heat seal surfaces when adjacent heat seal regions contact shortly after sealing. Some years ago cigarettes packaging machines had a top speed of approximately 140 packs per minute. Present day machines run at from 300–400 packs per minute, which is equivalent to approximately 160 ft. of film per minute. This speed makes the handleability or machineability of film, i.e. the ability of the film to be machine utilized, very critical. Film breakage or partial tearing and package to package sticking causes extremely expensive machine down time which cannot be tolerated.

Certain innovations have improved on the surface friction characteristics of highly crystalline polypropylene in film form. For example, in U.S. Pat. No. 3,176,021, incorporated herein by reference in its entirety, it is taught to include minor quantities of fatty acid amides into the polypropylene. In order to obtain the benefits taught by this patent, certain limitations must be observed. The film must be formed from a melt, extruded at a temperature between about 400°–550° F. In addition, the amide must be present in from 0.005 to about 2.0 weight percent of the polypropylene and it must be present along with from about 0.1 to about 4.0 weight percent polyethylene. Under these conditions and limitations the resulting polypropylene film will have a static coefficient of friction no higher than 0.6 which is signficantly higher than present day requirements. In addition, such a film does not have the high stereoregularity required by present day packaging demands. Further, it has been found that once said film has been subjected to the high temperatures which will be experienced in practice, particularly during heat sealing, i.e., approaching 270° F., the coefficient of friction increases significantly and is nowhere near the present day requirements of 0.25.

In U.S. Pat. No. 3,399,156, incorporated herein by reference in its entirety, it is taught that the inclusion of the combination of silicone oil and finely divided silica into a polypropylene film produces a film which will have a coefficient of friction of from 0.45 to 0.46 and be suitable for use in bread-wrapping machines. This is not a low enough co-efficient of friction for use in present day, high speed automatic packaging machinery.

It has been found that to a certain extent high crystallinity in polypropylene impedes facile migration of additives to the surface of such a polymer in film form. This problem has been addressed in U.S. Pat. No. 4,419,410, incorporated herein by reference in its entirety. This application teaches that by the coextrusion of a skin layer of polypropylene of comparatively low stereoregularity with a core layer of polypropylene of comparatively high stereoregularity, where this core layer contains a surface modifying agent such as an amide of a fatty acid, the amide will bloom to the surface of the comparatively low stereoregularity polymer with comparative ease.

In spite of these teachings, it remained until U.S. Pat. No. 4,419,411, incorporated herein by reference in its entirety, to significantly advance the art of making mul-til-layer polypropylene films suitable for most high speed packaging operations. This patent teaches a multi-layer polypropylene film structure having surface modifying agents comprising finely divided silica, silicone oil and an amide of a water insoluble mono-carboxylic acid having from about 8 to about 24 carbon atoms on a surface thereof.

Notwithstanding the general excellence of this film, it is found that when used in high speed cigarette pack wrapping machines, there is a tendency for the film surfaces of contacting packages to stick together, particularly in the areas where heat sealing has occurred.

It is an object of the present invention to provide a multi-layer polypropylene film structure having an extremely low coeffecent of friction over a wide temperature range which also contains a combination of surface modifying agents which eliminates or minimizes the tendency of the film surfaces to stick together when used in high speed packaging machinery.

It is another object to provide a process for preparing this multi-layer structure.

SUMMARY OF THE INVENTION

It has been discovered that by the inclusion of a simple polymeric material, in combination with silica and a silicone oil, into the skin layer or layers of the subject structure, a multi-layer film of non-sticking characteristics is obtained.

The present invention is directed to an oriented multi-layer polypropylene film structure comprising coextruded layers of:
 (a) a base layer comprising polypropylene of comparatively high stereo-regularity;
 (b) a skin layer comprising a polyolefin of comparatively low stereo-regularity on at least one surface of (a), said skin layer containing a surface-modifying proportion of a combination of finely divided silica, a silicone oil, and an anti-stick promoting proportion of a polymer incompatible with said skin layer polyolefin, said incompatible polymer having a melting point of greater than about 150° F. above the melting point of the skin layer polyolefin.

The present invention also is directed to a process for preparing the above-identified oriented multi-layer polypropylene structure comprising melt coextruding a combination of:
 (a) a base layer comprising polypropylene of comparatively high stereoregularity; and
 (b) a skin layer comprising a polyolefin of comparatively low stereoregularity on at least one surface of (a), said skin layer containing a surface-modifying proportion of a combination of finely divided silica and a silicone oil, and an anti-stick promoting proportion of a polymer incompatible with said skin layer polyolefin, said incompatible polymer having a melting point of greater than about 150° F. above the melting point of said skin layer polyolefin; and orienting the struture.

DESCRIPTION OF THE INVENTION

The present invention is broadly directed to the improvement of the surface characteristics of a multi-layer structure, the core layer of which is highly crystalline or highly stereoregular polypropylene in oriented film form. The preferred polypropylenes of the core layer are well known in the art and are formed by polymerizing polypropylene in the presence of stereospecific catalyst systems. They can have a melt flow rate at 446° F. ranging from about 1 to about 25, preferably 2 to 4. The crystalline melting point is about 321°-325° F. The number average molecular weight ranges from about 25,000 to about 100,000. The density ranges from about 0.90 to 0.91.

The comparatively low stereoregular polyolefin polymers contemplated as the skin material of the multi-layer system include, for example, random co-polymers of ethylene and propylene and ethylene-propylene-butylene terpolymers. Particularly preferred are the ethylene-propylene copolymers which contain from about 2 to about 7 wt. % and more preferably from 3-5 wt. % ethylene. They can have a melt flow rate at 446° F. ranging from about 2 to 15 and preferably 3 to 8. The crystalline melting point is about 257° to 302° F. The number average molecular weight range is from about 25,000 to about 100,000. The density ranges from about 0.89 to 0.90. These copolymers have excellent heat seal characteristics. They do not, however, have the excellent physical characteristics inherent in the polypropylene of comparatively high stereoregularity. Thus, the core material of polypropylene of high stereoregularity possesses the excellent characteristics of good moisture barrier, stiffness, high strength, good optical properties. The thin co-extruded surface layer of the comparatively low stereoregular ethylene-propylene random copolymer provides excellent heat seal characteristics. In order to take advantage of the excellent heat seal characteristics of this skin layer, the skin film must be modified so as to exhibit the characteristics of good slip and the tendency not to stick to an adjacent film region after being exposed to heat-seal temperatures.

The overall thickness of the contemplated multi-layer structure is primarily of the highly stereoregular polypropylene. The highly isotactic polypropylene portion of the structure should be about 93 to about 98% of the overall film structure. The co-extruded layer of comparatively low stereoregularity may be present on one or both surfaces of the core layer. It is preferred that the skin layer is on both sides of the core layer and that the thickness of each skin can range from about 1 to 6% of the overall film thickness. Preferably the skin layer has a thickness of about 0.3-0.7 microns.

The present invention is based upon the discovery that a combination of three surface modifying agents are unexpectedly superior, to a significant extent, than the individual agents or any combination less than all of the agents when the film is used in high speed packaging machines and the film undergoes heat-sealing.

One class of surface modifying agents is finely divided silica. The silica can be any commercially available, finely divided silica, preferably that having a mean particle size ranging from about 0.5 to 5 microns. One commercially available silica has a mean particle size of 0.75 microns and another has a mean particle size of 4.5 microns. Either material can be employed. The silica can be present in from about 0.05 to 0.5 wt. % preferably about 0.1 to 0.3 wt. % of the skin layer.

Another surface modifying agent is a silicone oil, preferably a dimethylsiloxane, having a viscosity of about 20,000 to 3,000,000, preferably 20,000 to 30,000 centistokes. This siloxane can be present in from about 0.3 to 0.8 wt. % of said skin layer.

The third necessary surface modifying agent is a polymer incompatible with the skin layer polymer and it must have a melting point of at least about 150° F. greater than that of the skin polymer. Examples of suitable polymers are polytetrafluoroethylene, the nylons, e.g. nylon 6, nylon 66, polycarbonate and poly(methylpentene), with the latter being preferred. The poly(methylpentene) is a 4-methylpentene-1-based polyolefin. In its preparation, propylene first goes through the dimerization stage to yield 4-methylpentene-1, which is then polymerized to poly(methylpentene). Its melting point is 455° F. and its density is 0.83. On melt blending with the skin polymer, which is predominantly polypropylene in character, two distinct phases result. On rapid mixing, micron size particles of poly(methylpentene) are dispersed throughout the skin copolymer. The poly(methylpentene) material can be melt blended with the skin film polymer in any manner. Any additive proportion, which will promote the antistick characteristics of heat sealed packages employing the finished film of the type described, is contemplated. It is preferred that from about 1,000 to about 6,000 ppm of the poly(methylpentene) be present in the skin layer.

An optional and preferred surface modifying agent for use herein is an amide of a water-insoluble monocarboxylic acid having about 8 to about 24 carbon atoms and mixtures of said amides. Specific examples of this class of amides are erucamide, oleamide, stearamide, behenamide, etc. It is preferred that this additive be included in the highly stereoregular core polypropylene in an amount of about 300 to 400 ppm of the core layer and/or in the skin layer in an amount up to about 2000 p.p.m. It is to be understood that the amide slip agent may be provided in the comparatively low stereoregular copolymer by dispersing the amide in the resin precursor of the comparatively high stereoregular polypropylene alone, the amide then exuding from the base or core film through the copolymer film to its surface. Thus, amide additive in the outer film resin starting material is not necessary, but may be desired.

The percentage of the surface modifying additives in the multi-layer structure should be such as to yield a coefficient of friction of the surface of the skin layers of 0.25. More particularly, the proportions should be such that the coefficient of friction of the surface of the skin layer or layers is about 0.25 at room temperature and is maintainable less than 0.8 up to about 270° F.

To further aid the heat seal characteristics and improve the optical properties of the film, the skin layer can also contain up to 10 wt. % of a natural or synthetic terpene resin, a wax, or a low molecular weight (e.g. 10,000) polyethylene.

The multi-layer films of the present invention can be prepared employing commercially available systems for coextruding resins. The polypropylene homopolymer of comparatively high stereoregularity containing, if desired, amide slip agent, can be coextruded with an ethylene-propylene random copolymer of comparatively low stereoregularity containing the appropriate percentage of the combination of silica, dimethylsiloxane and incompatible polymer dispersed therein. The polymers can be brought to the molten state and coextruded from a conventional extruder through a flat sheet die, the melt streams being combined in an adapter prior to being extruded from the die. After leaving the die orifice, the multi-layer film structure is chilled and the quenched sheet then reheated and stretched, e.g., 4 to 6 times in the machine direction (MD), and subsequently, for example, 4 to 10 times in the transverse direction (TD). The edges of the film can be trimmed and the film wound onto a core. It is preferred, particularly where the film contains an amide slip agent, that the thus formed structure be conditioned or equilibrated by holding the same for a period of about 6 hours to 1 week at a temperature from about 80° to about 125° F., especially preferred is a time from about 6 hrs. to about 72 hrs. at between 100°–125° F. This film will have on the surface thereof a combination of the four additives, amide, silica, silicon oil and the incompatible polymer. The resulting film will have a coefficient of friction of 0.25 or lower and will not block under conditions of tight winding after being held at temperatures up to 140° F.

Some commercially available core polymers, skin polymers and incompatible polymers and their at least approximate melting points are tabulated below:

TABLE

| Polymeric Material | Melting Point Range |
| --- | --- |
| All Homopolypropylene | 321°–325° F. |
| ARCO 9670 (ethylene-propylene random copolymer, 3 wt. % ethylene) | 284° F. |
| ARCO W756 (ethylene-propylene random copolymer 3.3–3.6 wt. % ethylene) | 273° F. |
| Chisso XF 7500 (ethylene-propylene-butene-1 terpolymer, 3.5 wt. % ethylene, 4.5 wt. % butene-1) | 266° F. |
| Chisso XF 7700 (ethylene-propylene-butene-1 terpolymer, 5 wt. % ethylene, 4.5 wt. % butene-1) | 250° F. |
| Solvay KS 400 (ethylene-propylene random copolymer) | 273° F. |
| Sumitomo FL 6711 (ethylene-propylene random copolymer, 4–6% ethylene) | 255° F. |
| Polycarbonate | 518° F. (process temp.) |
| nylon-6 | 446° F. |
| PTFE | 621° F. |
| poly(methylpentene) | 455° F. |

Coefficients of friction (COF) or slip may be determined by the "moving slide-stationary film" method of U.S. Pat. No. 3,399,156, incorporated herein by reference in its entirety.

The contemplated films can be tested by feeding a roll of film into a Scandia Model 712 Cigarette Pack Wrapping system with the capability of wrapping up to 200 packs of cigarettes per minute. This system is equipped with high percision controllers and a turn cage discharge. During transport through the system each pack is subjected to three heat seal regions which can cause package to package sticking together. The heat seal time is a fraction of a second. The film must maintain a COF at room temperature of between about 0.2–0.3 in order to avoid unacceptable drag which would lead to pack jamming and machine down-time. Success of the operation depends on the virtual absence of pack-to-pack sticking, a moderate to low force necessary to move the packs through the system and a seal range of at least 20° F. on all seal surfaces.

EXAMPLES

EXAMPLE 1

A polypropylene homopolymer of comparatively high stereoregularity, i.e. ARCO W472, is melt coextruded with skin layers of ARCO W756, an ethylene-propylene copolymer having from 3.3–3.6 wt. % ethylene, said copolymer containing 4,000 ppm of a dimethylpolysiloxane, having a viscosity of 30,000 centistokes, 2,000 ppm silica of a mean particle size of 0.75 micron and 4,000 ppm of poly(methylpentene) having a density of 0.83 and a melting point of 455° F. Poly(methylpentene) is a product identified as TPX and is obtainable from Mitsui Petrochemical Industries Ltd., Tokyo, Japan. The resulting film has an overall thickness of 21 microns with the core layer being 19.8 microns and the skin layers being 0.6 microns each. Utilizing the above-described multi-layer film, cigarette packages, can be wrapped per the above-described process and apparatus at a rate of approximately 172 packs per minute. This wrapping can be successfully accomplished with a virtual absence of package-to-package sticking. A moderate to low force will be necessary to move the packages through the machine system. There will be a seal range or latitude of at least 20° C. on all seal surfaces.

EXAMPLE 2

Example 1 is repeated except the base layer contains 400 parts per million erucamide slip agent and the skin layers contain 700 parts per million of the same.

This film when employed in the same cigarette package wrapping system described above will show the same degree of success, except that the drag force through the system would be reduced by approximately 30%, from a moderate to a low level.

EXAMPLE 3

Example 1 is repeated except that the poly(methylpentene) is excluded. Employing the resulting film in the same cigarette wrapping system, the system will jam within one to two minutes due to package to package sticking and increased drag.

EXAMPLE 4

Example 1 is repeated except the skin layer consists of Chisso XF 7700, a terpolymer of ethylene-propylene-butylene and the poly(methylpentene) is replaced with polytetrafluoroethylene having a particle size of about 5–10 microns. The same weight proportion of PTFE as poly(methylpentene) is employed. The resulting film, when employed in the same cigarette wrapping apparatus will have the same degree of success as the film of Example 1.

EXAMPLE 5

Example 1 is repeated replacing the ethylene-propylene copolymer with Sumitomo FL6711, which is an ethylene-propylene copolymer containing approximately 4–7 wt. % ethylene. Instead of dispersing the poly(methylpentene) in the skin film material, 4000 ppm, subdivided polycarbonate is employed. During preparation, the polycarbonate is melt dispersed in the ethylene-propylene copolymer to yield a dispersed phase having an average particle size of from 1–2 microns. The resulting film can be employed in the same cigarette wrapping system and the same degree of success as Example 1 will be experienced.

EXAMPLE 6

Example 1 is repeated except the silicone oil is excluded. When the resulting film is used in the above described system, jamming will occur almost immediately because the COF will not be low enough, particularly after heat sealing.

EXAMPLE 7

Example 1 is repeated with only poly(methylpentene) dispersed in the skin layer. This film will cause wrapping system jamming almost immediately.

EXAMPLE 8

Example 1 is repeated with nylon-6 replacing the poly(methylpentene) in an equal wt. %. Equally successful results will be obtained in using the film in the described wrapping system.

What is claimed is:

1. An oriented multi-layer polypropylene film structure comprising coextruded layers of:
(a) a base layer comprising polypropylene of comparatively high stereoregularity; and
(b) a skin layer comprising a polyolefin of comparatively low stereoregularity on at least one surface of (a), said skin layer containing a combination of finely divided silica, a silicon oil and a polymer incompatible with said skin layer polyolefin, said incompatible polymer having a melting point of greater than 150° F. above the melting point of the skin layer polyolefin.

2. The structure of claim 1 wherein said incompatible polymer is a member selected from the group consisting of poly(methylpentene), polycarbonate, polytetrafluoroethylene and nylon.

3. The structure of claim 2 wherein said skin layer is a member selected from the group consisting of an ethylene-propylene random copolymer and ethylene-propylene-butylene terpolymer.

4. The structure of claim 3 wherein said skin layer is an ethylene-propylene random copolymer with an ethylene content of about 2 to about 7 wt. %.

5. The structure of claim 4 wherein said ethylene-propylene random copolymer has an ethylene content of about 3–5 wt. %.

6. The structure of claim 3 wherein said incompatible polymer is present in from about 1,000–6,000 ppm. of said skin layer.

7. The structure of claim 3 wherein said silicon oil is dimethylpolysiloxane having a viscosity of about 20,000 to 3,000,000 centistokes.

8. The structure of claim 7 wherein said siloxane is present in from about 0.3 to 0.8 wt. % of said skin layer.

9. The structure of claim 3 wherein said silica has a mean particle size of from about 0.5 to 5 microns.

10. The structure of claim 9 wherein said silica is present from about 0.05 to 0.5 wt. % of said skin layer.

11. The structure of claim 3 also containing an antislip proportion of an amide of a water-insoluble monocarboxylic acid having from about 8 to 24 carbon atoms wherein said amide is present in the precursor resin of said base layer in from about 300 to 400 ppm, and present in said skin layer in up to about 2000 ppm.

12. The structure of claim 11 wherein said silicone is dimethylsilicone having a viscosity of from 20,000–30,000 centistokes and present in from about 0.3 to 0.8 wt. % of said skin layer, said silica has a mean particle size of about 0.5–5 microns and is present in from about 0.05 to 0.5 wt. % of said skin layer and said incompatible polymer is poly(methylpentene) present in from about 1000–6000 ppm of said skin layer.

13. The structure of claim 12 wherein the skin layer is an ethylene-propylene random copolymer.

14. The structure of claim 13 wherein the coefficient of friction of the surface of (b) is at least as low as 0.25.

15. The process for preparing an oriented multi-layer polypropylene structure comprising melt coextruding a combination of:
(a) a base layer comprising polypropylene of comparatively high stereoregularity; and
(b) a skin layer comprising a polyolefin of comparatively low stereoregularity selected from the group consisting of an ethylene-propylene copolymer and an ethylene-propylene-butylene terpolymer; on at least one surface of (a), said skin layer containing a combination of finely divided silica and a silicon oil; and also containing a polymer incompatible with said skin layer polymer, said incompatible polymer having a melting point of greater than about 150° F. above the melting point of said skin layer polymer; and orienting the structure.

* * * * *